United States Patent [19]

Colato et al.

[11] 4,005,745
[45] Feb. 1, 1977

[54] APPARATUS FOR STORING, REFRIGERATING AND HEATING FOOD ITEMS

[75] Inventors: Albert E. Colato, St. Paul; Jerome L. Formo, Roseville, both of Minn.

[73] Assignee: Anchor Hocking Corporation, Lancaster, Ohio

[22] Filed: Sept. 30, 1974

[21] Appl. No.: 510,746

[52] U.S. Cl. .................. 165/2; 165/30; 165/61; 312/236

[51] Int. Cl.[2] ...................... F25B 13/00

[58] Field of Search ............ 165/30, 61, 2; 312/236

[56] References Cited

UNITED STATES PATENTS

| | | | |
|---|---|---|---|
| 2,577,870 | 12/1951 | Aston | 219/19 |
| 2,616,269 | 11/1952 | Reynolds | 62/89 |
| 2,919,339 | 12/1959 | Hilliker | 219/35 |
| 3,042,384 | 7/1962 | Bauman | 257/293 |
| 3,129,041 | 4/1964 | Trayloff et al. | 312/236 |
| 3,205,033 | 9/1965 | Stentz | 312/236 |
| 3,389,946 | 6/1968 | Nicolaus et al. | 312/236 |
| 3,408,481 | 10/1968 | Golden | 219/386 |
| 3,550,978 | 12/1970 | Magee | 312/108 |
| 3,572,537 | 3/1971 | Baltzer | 220/23.4 |
| 3,608,627 | 9/1971 | Shevlin | 165/30 X |
| 3,615,713 | 10/1971 | Stevenson | 99/171 H |
| 3,725,645 | 4/1973 | Shevlin | 219/521 |
| 3,784,787 | 1/1974 | Shevlin | 219/521 X |
| 3,830,148 | 8/1974 | Shevlin | 99/359 |
| 3,908,749 | 9/1975 | Williams | 165/61 X |

Primary Examiner—C. J. Husar
Assistant Examiner—Sheldon J. Richter
Attorney, Agent, or Firm—Connolly & Hutz

[57] ABSTRACT

An apparatus for storing, refrigerating and heating food items on a single tray in a single environment including a tray having at least one opening therein and a container together with means for positioning the container on the tray in alignment with the opening. A rack for the tray and a heater carried by the rack in alignment with the opening in the bottom of the tray when the tray is mounted on the rack, the heater being substantially in contact with the bottom of the container, which raises the container free of the tray to form an air barrier between the container and the edge of the opening in the tray, together with means for refrigerating the rack to refrigerate items on the tray, and means for selectively actuating the heater to heat food in the container while other food on the tray remains refrigerated.

12 Claims, 10 Drawing Figures

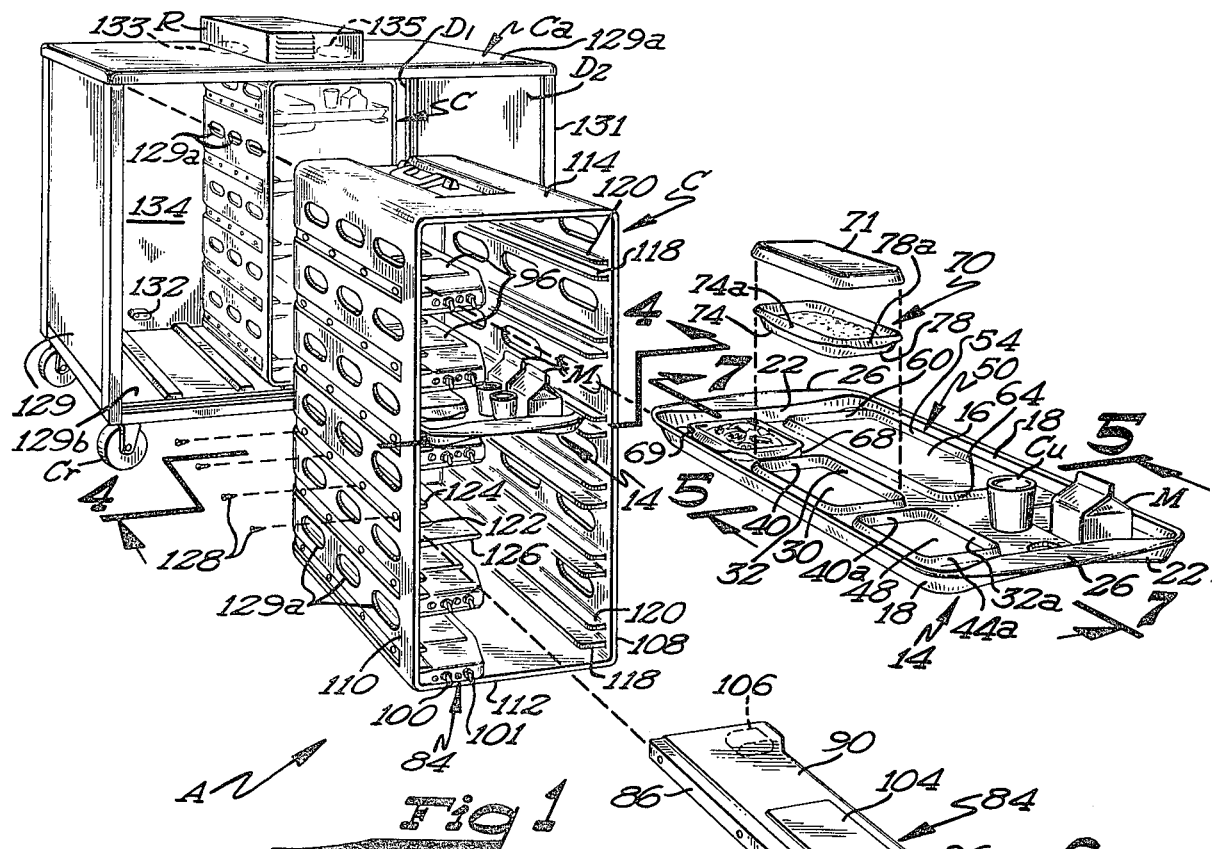
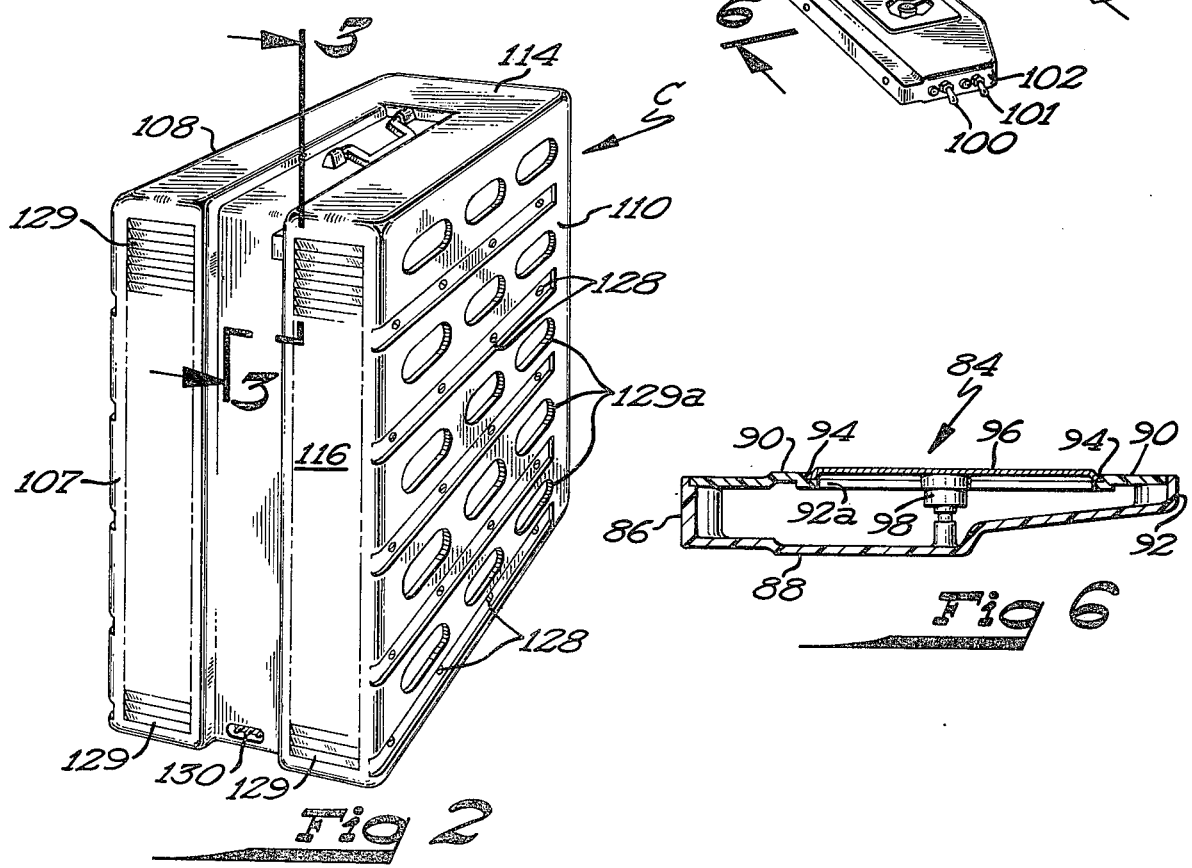

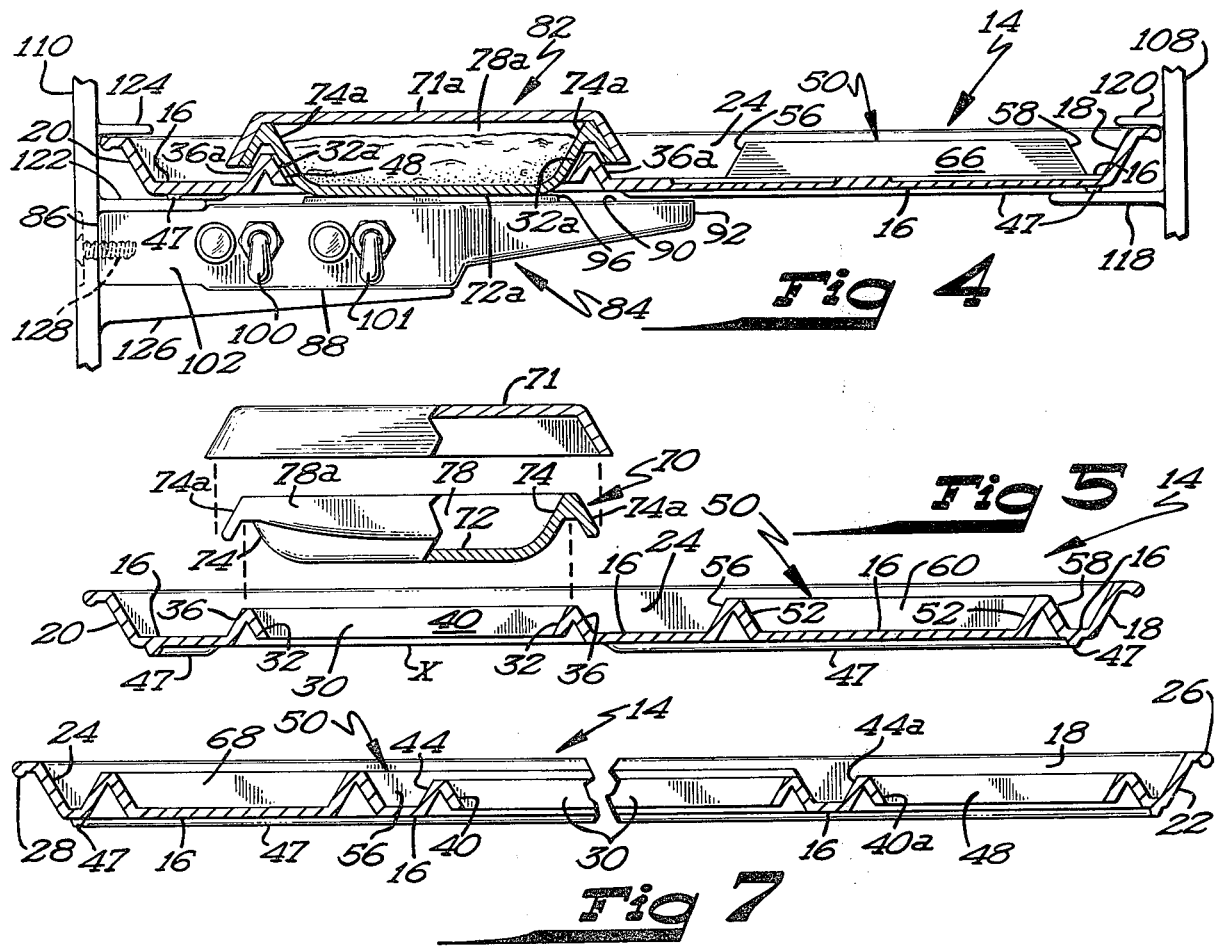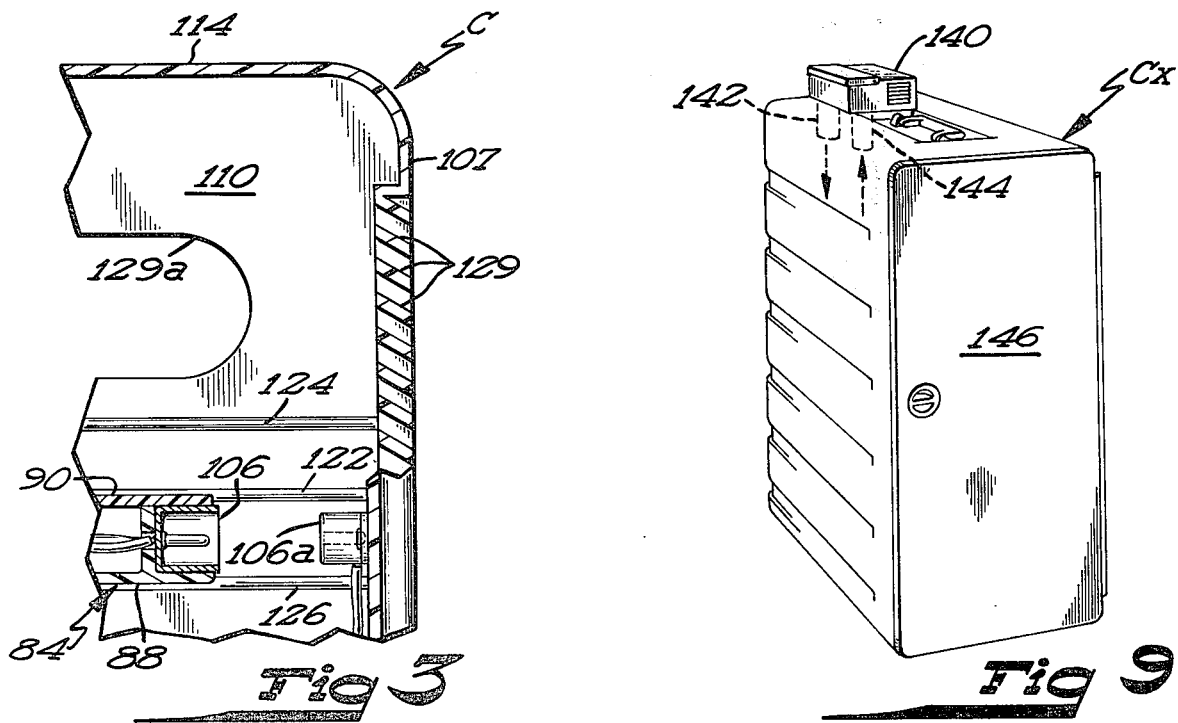

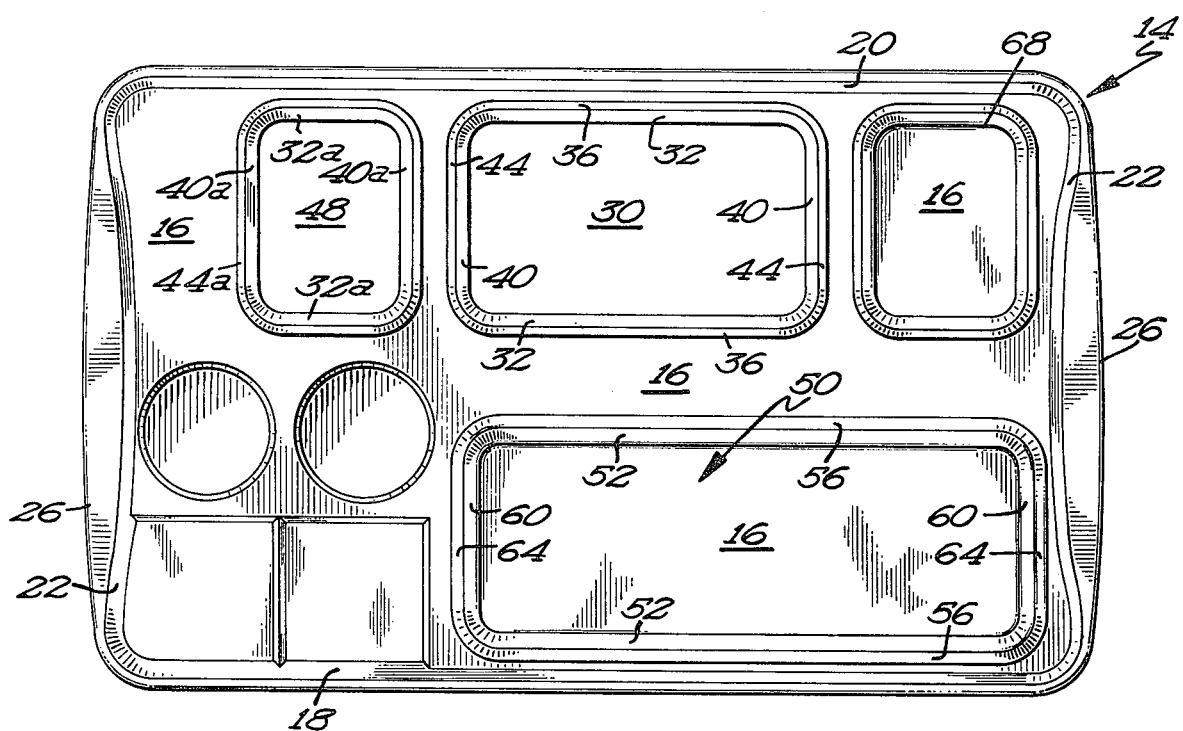
Fig 8
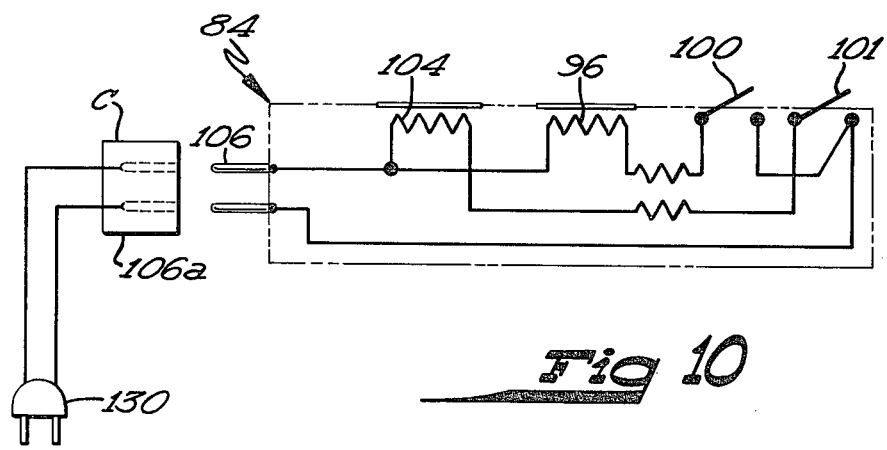
Fig 10
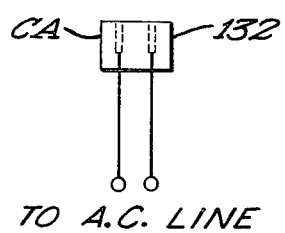
TO A.C. LINE

APPARATUS FOR STORING, REFRIGERATING AND HEATING FOOD ITEMS

SUMMARY

The invention relates to an improvement in a food serving apparatus for the storage and distribution of a prepared meal or meals each complete meal on a single tray contained within a refrigerated medium for storage with certain selected sections of the tray including dishes heatable to serving temperatures at a selected time and/or held at a holding temperature while other dishes on the tray remain refrigerated.

With present known devices for distributing hot food items with refrigerated items on the same tray there are various drawbacks such as the requirement of one container for hot food and a second container for cold food from which the meal must be assembled. Another system allows preset or fully assembled tray meals but has no provision for re-heating or re-cooling and which simply stores the food in an insulated unit. For meals that are assembled from separate hot and cold containers mistakes can occur in assembling the tray which is critical in the case of hospitals where diets must be rigidly controlled. Further the insulated units maintain the hot and cold food for a limited time.

In a device which has a cart having a separate section for hot food and refrigerated food it has no means for refrigerating the food during preliminary storage prior to heating when desired. The hot portion has to be placed in the device hot and the temperature of the portion maintained which limits holding periods since the hot food is continually being heated and the food deteriorates when the holding period is relatively long. Trays in such systems are exceedingly bulky.

A further known system provides means of heating the dish holding the hot portions of the meal with an integral heater. The dish when heated must be assembled on a tray containing the refrigerated portions of the meal.

The herein disclosed inventive concept in one form includes a refrigerated enclosure, mobile or stationary, multiple meal tray carriers in the form of racks and having heating elements carried by the rack which when actuated heat only selected meal portions in covered dishes supported on the trays. Prior to the need for heating selected meal portions, said portions are maintained in a refrigerated holding condition until needed for heating. The tray racks have openings which allow communication thereof with the refrigerated interior of the enclosure thereby refrigerating the contents of the racks. With the tray racks in the refrigerated enclosure, the device can selectively heat and keep meal portions hot in covered dishes while at the same time maintain cold portions cold all in palatable condition on the same tray for desired periods of time. Additionally the rack itself may have its own refrigeration.

With the subject food serving apparatus a complete meal with food such as an entree and soup which require heating, and food such as salad, dessert and butter which require refrigeration are all loaded on a single food tray at one time. The food tray is slidably mounted upon supports within the tray rack, with one or more heating elements carried by the rack in a position beneath a tray. The tray is formed with one or more openings through which the dishes to be heated extend for contact with a heating element mounted on the rack when the tray and the dish thereon are placed upon the tray supports. The dishes to be heated each has a close-fitting removable cover which in effect makes the dish a miniature oven and the surface area of the heating means is substantially that of the area of the bottom of the dish to be heated. The dishes to be refrigerated are mounted on the tray and are therefore subject to the refrigerated atmosphere of the cart in which the tray rack is contained.

The enclosure or cart with its tray rack or racks and complete trays within the same may be prepared with food at a central supply point and then conveyed to any desired location and during such time all food on the tray remains refrigerated.

When it is desired to prepare and serve the tray nothing has to be added to the tray, nothing removed nor does the tray have to be moved. To heat the designated food dishes the heating means is actuated by controls provided while the trays are on the tray supports and within the rack which in turn is within the refrigerated enclosure. After the designated dishes are heated the enclosure may be opened and one or more trays complete with hot and refrigerated food components may be served, or the same may be held at a desired holding temperature by conventional means if service of the meal can not be made immediately upon full heating thereof. The refrigerated dishes remain refrigerated until service of the meal tray is made. When the meals on the trays have been consumed, the trays are returned to the racks which are returned for further processing.

The present concept may be applied to the "demand" type service of food in rooms in hospitals, motels, nursing homes, and the like where one or more meals for a day with each meal on a tray are brought in a tray carrier and store in a refrigerated condition. At a time when a meal is desired by the occupant of the room, for example, the breakfast tray meal, portions of the breakfast are heated as herein described. Later on in the day and at any desired time when a lunch is desired, portions of the lunch tray are heated as described herein. Similarly with the dinner meal, portions of the dinner tray are heated when desired and all the while the remaining portions of the meal are kept in a refrigerated condition. It will be seen that the multiple meal tray unit for a given room is loaded only once and is completely loaded at an initial supply point. The tray carrier may have a multiplicity of meals which are stored in a refrigerated condition in a given room with one or more occupants in the room. With the tray meals fully prepared at a single initial supply point under any of the foregoing the amount of labor required is greatly reduced and there is little chance for mistake as to the particular tray contents for a given recipient of the tray meal.

Location feeding, that is the feeding of individuals at a location generally remote from food service facilities, can be accomplished by providing a refrigerated tray rack having means for heating certain of the food dishes on the trays therein as hereinbefore described and transported by an appropriate vehicle having means for holding one or more tray racks.

Briefly, and in conclusion, a complete meal is loaded onto a single tray at a single point of assembly, the meal including both food to be heated and food requiring only refrigeration. Both types of food items are refrigerated and held until needed. When needed, the heating means is simply actuated for the refrigerated food requiring heating and the tray served with a complete meal including hot and refrigerated food. Once the tray meal is assembled nothing has to be done to the tray or the food therein except heat certain food thereon and then serve the entire meal. The apparatus may be used to serve meat, vegetables, salad, soup, pastry, eggs, pancakes, and the like as hereinafter referred to.

With the rethermalization of food accomplished by the apparatus herein disclosed the walls and top of the food container are kept chilled in the circulated refrigerated atmosphere while the heating of the food in the container is taking place which results in a minimum loss of humidity. In other systems there is a substantial loss of humidity and as a result the food becomes dried out.

Vitamin C is the first vitamin lost in cooking which is lost through loss of moisture in the food. With the apparatus disclosed herein vitamin C is retained to a relatively high degree due to retention of moisture in the food container due to the cooling of the walls and top of the food container while heated from the bottom.

Additionally, with the apparatus disclosed the flavor of food and food odor is retained to a greater extent than in other cooking systems, and original vegetable color is also retained to a greater degree.

In the drawings forming part of this application:

FIG. 1 is an exploded perspective view of the apparatus for heating, refrigerating and storing food on the same tray embodying the invention.

FIG. 2 is a perspective rear view of the tray rack that is housed in the refrigerated cart.

FIG. 3 is a section taken along the line 3—3 of FIG. 2.

FIG. 4 is a section substantially along line 4—4 of FIG. 1 with the tray supported in the rack and a covered dish upon the tray contacting the heater carried by the rack.

FIG. 5 is a section taken along line 5—5 of FIG. 1.

FIG. 6 is a section taken along line 6—6 of FIG. 1.

FIG. 7 is a longitudinal section of a tray through the openings therein.

FIG. 8 is a top plan view of the tray.

FIG. 9 is a perspective view of a tray rack substantially that of FIG. 1 but which is a self-contained unit including refrigerating means. for the rack.

FIG. 10 is a circuit diagram of the heater system and its connection with a power source.

Referring to the drawings, the food treating and storing assembly A includes a support in the form of a food storage and serving tray 14 which has a generally flat panel portion 16, obliquely disposed side and end walls 18 and 22 respectively. Hand grips 26 extend from the end walls 22. The tray 14 has an opening 30 with upwardly diverging side walls 32 and end walls 40 terminating in downwardly diverging wall portions 36 and 44 respectively which constitute a rib formation (also see FIGS. 5, 7 and 8). The tray 14 may be molded from a suitable plastic material such as styrene, styrene acrylonitrile, "ABS" or the like as a unit.

A peripheral rib 47 is formed on the bottom surface of the tray 14 adjacent the edges and sides except as at X (see FIG. 5) which allows insertion of the tray without interference into contact with the heating means hereinafter described.

A further opening 48 is formed in the panel portion 16 of tray 14 having wall formations identical to those surrounding opening 30 with identical parts bearing identical reference numerals accompanied by the letter a (see FIG. 8). The tray 14 also includes a rectangular section or food compartment 50 formed on the upper surface of the panel portion 16 which includes the upwardly diverging sidewalls 52 and end walls 60 which terminate in the downwardly diverging wall portions 56 and 64 respectively, which, in turn, terminate in the panel portion 16. The panel portion 16 forms the floor for the food section 50, the walls of which may be molded of plastic material and integral therewith. Various dishes and/or trays may be placed within compartment 50 which prevents movement of the dish, etc. upon the tray.

The tray 14 may also have a raised rectangular formation 68 which is identical to the raised rectangular formation 50 but of smaller area within which a dish or tray may be contained.

Used in conjunction with the opening 30 of the tray is a container in the form of a dish 70 having a bottom wall 72 from which extends upwardly diverging side walls and end walls 74 and 78 with corresponding downwardly diverging extensions 74a and 78a respectively. The dish 70 may generally be used for a hot meal entree such as meat, fish or the like and may be made of heat resistant plastic such as "Melamine", a formaldehyde molding material, glass, ceramic, metal or the like. The divergent angles of the side and end walls of the dish 70 are substantially the same as that of the walls 32 and 40 bordering the opening 30 whereby the dish walls overlie the opening 30 with the dish nesting within the walls. The vertical dimension of the dish 70 is such that when it is within the opening 30 the bottom wall 72 of the dish extends below the panel portion 16 but above the lower edge of the rib 47 of the tray 14. The dish is provided with the tight fitting cover 71.

Used in conjunction with the opening 48 of the tray 14 is dish 82 (see FIG. 4) constructed identical to the dish 70 except that it is shorter. The reference numbers are the same as with dish 70 except for the letter (a) following the number. The dish 82 has a vertical dimension such that when it is within the opening 48 the bottom of the dish extends below the panel portion 16 of the tray 14 but above the lower edge of the rib 47 as in the case of the dish 70. The remaining area of the tray is essentially flat for supporting
items such as the cup Cu and the milk carton M.

The numeral 84 designates one of several identical tray supports, particularly FIGS. 1 and 6. The tray support 84 includes the sidewalls 86 and 92 to which are connected the bottom wall 88 and the spaced top wall 90. Formed in the top wall 90 is rectangular opening 92a and on the periphery thereof is recess 94. Mounted in the recess 94 is a first conventional electric heating element 96 which extends slightly above the top surface of top wall 90. The recess 94 may be coated with silicone to insulate the heating element from the top wall 90 of the support 84. A conventional thermostat 98 is mounted upon the bottom wall 88 and extends into contact with the heater element 96. The element 96 is connected to a source of power as hereinafter described and is turned "off" and "on" by a conventional switch 100 mounted on the end wall 102 of the support 84.

A second conventional electric heater 104 is provided which is mounted identically to heater 96 and controlled by a thermostat as in a case of the heater 96. The heater 104 is connected to, and turned "off" and "on" by, the conventional switch 101. The heaters 96 and 104 are conventionally wired to a male plug 106 mounted on the inner end wall of the tray support. The plug 106 of the tray support engages the receiver 106a mounted on the rear wall 106 of the rack C, FIG. 3 when the tray support is inserted into operative position in the rack C. The heater 104 if used for an entree such as meat may have a control to start the heater at approximately 110 watts with a cutback to approximately 53 watts for holding. With the heater 96 for soup the same would be started at 44 watts with a cutback to 28 for holding.

The area of the heater in each instance is substantially that of the area of the bottom of the dish heated thereby, and as a result heat from the heater element does not go into the free air in the carrier but is substantially confined to the dish 70.

The dimensions and the disposition of the sidewalls 32 and the end wall 40 of the tray and the walls of the dish are such that when the dish 70 is placed on the same as in FIG. 4 and the tray 14 is placed with the ribs 47 on the flanges 118 and 122 of the rack C, the heater 96 of the support 84 is so positioned that it raises the dish upward slightly and substantially free of the sidewalls 32 and endwalls 40. As a result an insulating air barrier is formed and there is essentially no heat conduction from the heated dish 70 to the tray via contact with the wall formations 32 and 40 which allows maximum refrigeration for food items not being heated. The same is true of dish 71a supported within opening 48 and the wall formations 32a and 40a and heater 96 whereby there is essentially no conduction of heat from the heated dish 71a to the tray which allows maximum refrigeration for food items not being heated. Briefly put, with the dish raised slightly and out of contact with any part of the tray, particularly FIG. 4, the dish is in effect insulated from the tray due to the air space between the dish and the tray.

The letter C designates a tray carrier in the form of a rack for trays which includes the sidewalls 108 and 110 connected to bottom wall 112, the top wall 114 and the inner end wall 116. Secured to the inner surface of the wall 108 are pairs of spaced flanges 118 and 120 and in juxtaposition thereto on the wall 110 are pairs of spaced flanges 122 and 124. Further provided is a major flange 126 connected to the wall 110 and underlying each flange 122. The support 84 is positioned for support between the flange 122 and the flange 126 and secured by means such as screws 128 extending through side wall 86 of the support 84 and through the wall 110 of the carrier. The top surface of the support 84 is substantially in the same plane of the flanges 118 and 122 and the rib 47 on the bottom of the tray will rest on and be supported by the flange 122 and the flange 118.

As the tray 14 is placed on the flanges 118 and 122 the bottom of the dish 70 makes intimate contact with the heater unit 104, for, as described the bottom wall of the dish extends below the surface of the opening 30 and as the tray is placed on the flanges and the dish contacts the heater the dish is raised from the tray to a position slightly above and free of the tray. Similarly with the dish 82 upon the opening 48. The rear wall 107 of the tray carrier C is formed with the louvers 129 and the sidewalls 108 and 110 are formed with the openings 129a which allow circulation of the refrigerated air of the cart Ca, throughout the tray rack C to refrigerate the items on the trays 14. The conventional male plug 106 of each tray 14 engages in a conventional female receptacle 106a on the rear wall of the carrier C which hooks up the heaters 96 and 104, FIG. 10.

The carrier or rack C has the conventional male plug 130, FIGS. 2 and 10, on the rear wall thereof and conventionally wired to the receptacles 106a which engages the conventional female receptacle 132 on the rear wall 134 of the cart Ca. The rear wall is connected to the end walls 129 and 131, the top 129a and the bottom 129b. The cart Ca is also equipped with a caster Cr at each corner of the bottom 129b. Electric power is conventionally supplied to the receptacles 132 of the cart Ca provided for each of the racks C. The cart Ca carries the enclosure R in which is positioned conventional "dry ice" or the like which thermally communicates with and refrigerates the cart through openings 133 and 135. Also mounted in the enclosure R is a conventional squirrel cage fan, not shown, to facilitate circulation. Sliding doors D1 and D2 are supplied for the cart to seal-off the cart when the tray racks C are enclosed within the cart. Hinged doors may also be used on the cart Ca. A conventional electrical refrigeration unit may be carried by the cart and in communication with the interior of the cart for refrigerating the cart in lieu of the aforementioned refrigeration means. The rack C may be permanently mounted in the cart Ca and used relative thereto.

With reference to FIG. 9 there is illustrated a rack or carrier Cx which is identical to the carrier or rack C found in FIGS. 1 and 2. However, with the carrier rack Cx there is mounted on the top thereof the enclosure 140 which is adapted to contain dry ice and the enclosure communicates with the interior of the carrier Cx by means of the conduit 142. A further conduit 144 also communicates the enclosures 140 with the interior of the container or carrier Cx. The enclosure 140 also contains a conventional squirrel cage blower fan which directs cold air from the dry ice downwardly through the conduit 142 and the conduit 144 is used as a return. The blower fan is connected to an electrical source of power. The carrier rack Cx is also supplied with the door 146. Thus, with a refrigerated carrier or rack Cx the cart Ca is not necessary.

OPERATION

Prepared food such as an entree in the form of a steak, which requires heating, is placed in the dish 70 and the dish placed upon the opening 30 with the cover 71 on the dish. Similarly prepared food such as soup, which requires heating, is placed in the dish 82 and the dish placed on the opening 48 with a cover 71a on the dish. Additional food such as a salad which requires cooling may be placed in the dish 69 which is positioned within the rectangular raised formation 68 to secure the dish against movement on the tray 14. Still further food requiring refrigeration may be placed in dishes positioned within the raised rectangular formation 50. The milk carton M and the cup Cu are placed on the remaining portion of the tray, the milk being subject to and requiring refrigeration.

The tray 14 is then placed upon flanges 118 and 122 within the rack C along with other trays desired. The loaded carrier C is then moved into the refrigerated cart Ca with the plug 130 engaged with the receptacle 132 and the doors D1 and D2 closed. The refrigeration means is then actuated which refrigerates the air in the cart, and the refrigerated air circulates through the louvers 129 and openings 129a of the carrier C and into the carrier thereby refrigerating all the items including food to be heated on the tray. All the food is thus held in a refrigerated condition until needed.

When it is desired to prepare and serve the food on the tray nothing has to be added to the tray, nothing removed, nor does the tray have to be moved. The heaters 96 and 104 are actuated sufficiently prior to a need for heated food in dishes thereon. It has been found that a 35 minute heating period is satisfactory. The doors D1 and D2 or 146 can be opened momentarily to actuate the switches. All the while the remaining food is being refrigerated and kept fresh. The heat generated in the dishes 70 and 82 is substantially maintained within the dishes. When the food in the dishes is thoroughly heated the tray may be served. In the event service of the heated food is not desired immediately, the heaters may be automatically put on a lower or hold temperature by conventional means with the remaining foods continuing to be refrigerated for a later serving of the meal on the tray. The tray, when supported on a table or the like, rests on the rib 47 and as a result the hot dishes 70 and 82 do not contact the surface of the supporting element.

While in general each heating means will be required for a complete meal it may be desired to heat only a selected dish on a tray and this may be accomplished by operating only the appropriate switch for a given heater.

As to the versatility of the apparatus, eggs may be pre-cooked to the degree desired outside the apparatus, refrigerated and then be re-heated in the apparatus for the same heating period as other foods by placing the pre-cooked eggs on a piece of toast in the dish 70 which, due to the insulative quality of the toast, retards the heating of the eggs and results in highly palatable, tender eggs.

Relative to steaks, the same can be cooked to various degrees of doneness by controlling the amount of moisture. To achieve a "well done" steak, the same is seared outside the apparatus for twenty seconds to carmelize the surface. The steak is then placed in dish 70, and when desired, heated for the aforementioned 35 minute period with the result that the steak is well done. To achieve a "medium" done steak it is also seared for 20 seconds and placed on a piece of toast in dish 70 with 2 teaspoons of water in the dish, and to achieve a "rare" steak it is also seared as above and placed on a piece of toast in the dish but with no moisture added. In normal practice, food is refrigerated before heating in the apparatus.

A dish of macaroni and cheese is pre-cooked outside the apparatus and then heated for the aforementioned 35 minute period in the dish 70 with no special preparation except as indicated above.

Fish is given a partial pre-cooking outside the apparatus and then heated in the dish 70 for the aforementioned 35 minute period. Braised or stewed items require no special preparation other than pre-cooking and refrigeration.

Hot breads, rolls, pastries, pies and the like may be heated by lining the dish such as 70 or 82 with foil and adding a small quantity of water to produce a steam effect Pancakes and french toast are pre-cooked and placed upon bacon or sausage for an insulative effect and then subjected to the 35 minute heating period after which the cakes or french toast are totally palatable along with the bacon and sausage.

The apparatus produces, because of its gentle heating characteristics, food which is nutritionally as good as freshly cooked product, although it may be refrigerated for extensive periods prior to re-heating. Because the food is held in a refrigerated controlled environment, bacteriologically it is safe, as all food items are maintained at normal food refrigerated storage temperatures of about 40° F and only reheated from storage to serving temperatures which is in excess of about 160° F.

We claim:
1. Apparatus for storing, refrigerating and heating food items in serving containers comprising in combination:
   a. serving containers containing food items
   b. a tray supporting the serving containers,
   c. at least one opening extending through the tray surface,
   d. means supporting and positioning one of said serving containers containing a food item to be heated within said opening,
   e. a cover on said serving container for said food item to be heated,
   f. a rack for said tray,
   g. said rack having means for mounting said tray thereon,
   h. means contacting the bottom of said serving container containing food to be heated for heating said container when the tray is mounted in the rack, said heating means being so positioned that it supports the serving container vertically above and out of contact with said container supporting and positioning means,
   i. means for refrigerating said rack to refrigerate all said food items in said serving containers on said tray, and
   j. means for actuating said heating means to heat said food item in said refrigerated serving container which is in contact with said heating means while other food items in serving containers on the tray remain refrigerated.

2. The apparatus of claim 1 wherein the refrigerating means is a stream of cold air which circulates over and around the serving containers on the tray.

3. Apparatus for storing, refrigerating and heating food items in serving containers comprising in combination:
   a. serving containers containing food items,
   b. a tray supporting the serving containers,
   c. at least one opening extending through the tray surface,
   d. means supporting and positioning one of said serving containers containing a food item to be heated within said opening,
   e. a rack for said tray,
   f. said rack having means for mounting said tray thereupon,
   g. heating means carried by said rack in alignment with the tray opening and being in contact with the bottom of said serving container containing food to be heated when the tray is mounted on the rack, said heating means being so positioned that it supports said serving container vertically above and out of contact with said container supporting and positioning means,
   h. means for refrigerating said rack to refrigerate all said food items in said serving containers on said tray, and
   i. means for actuating said heating means to heat said food item in said refrigerated serving container which is in contact with said heating means while other food items in serving containers on the tray remain refrigerated.

4. The apparatus of claim 3 in which said container for the food item to be heated is a dish and a cover fits on the dish.

5. The apparatus of claim 3 in which said container supporting and positioning means includes
   a. recess means formed on said container engageable with
   b. a rib formation on said tray adjacent said opening.

6. The apparatus of claim 3 in which said rack includes
   a. spaced side walls,
   b. a top wall,
   c. a bottom wall, and
   d. a rear wall.

7. The apparatus of claim 3 in which the mounting means of said rack for said tray includes flange means carried by said rack.

8. The apparatus of claim 3 in which said means for refrigerating said rack includes
   a. an enclosable cart having refrigerating means and in which said rack is mounted.

9. Apparatus for storing, refrigerating and heating food items in serving containers in a single environment comprising in combination:
   a. serving containers containing food items,
   b. a tray supporting said serving containers,
   c. at least one opening extending through said tray surface,
   d. means supporting and positioning one of said serving containers containing a food item to be heated within said opening,
   e. a cover for said container containing said food item to be heated,
   f. an enclosure for said tray,
   g. means for mounting said tray within said enclosure,
   h. heating means carried by said enclosure in alignment with said tray opening and being in contact with the bottom of said serving container containing food to be heated when the tray is mounted in the enclosure, said heating means being so positioned that it supports said serving container vertically above and out of contact with said container supporting and positioning means,
   i. means for refrigerating said enclosure to refrigerate all said food items in said serving containers on said tray, and
   j. means for actuating said heating means to heat said food item in said refrigerated serving container in contact with said heating means while other food items in serving containers on the tray remain refrigerated.

10. Apparatus for simultaneously refrigerating and selectively heating food items in serving containers comprising in combination:
    a. serving containers containing food items,
    b. a tray supporting the serving containers,
    c. at least one hole in the tray,
    d. a rib adjacent the portion of the tray surrounding the hole periphery,
    e. one of said serving containers containing a food item to be heated having means on the container periphery which engages said rib to support and position said container within said hole so that the bottom of the container extends through said hole,
    f. a cover for said serving container containing said food item to be heated,
    g. a rack supporting said tray,
    h. support means affixed to said rack and positioned under the tray in close proximity thereto, said support means having an upper surface,
    i. a heating plate mounted on said support means which plate extends above the upper surface of the support means and contacts the bottom of said serving container containing food to be heated positioned within the tray hole, said plate being so positioned that it supports the container vertically above and out of contact with said rib adjacent the periphery of the hole in the tray when the tray is supported on the rack,
    j. an enclosure for said rack,
    k. refrigerating means associated with said enclosure for refrigerating all said food items in said serving containers on said tray, and
    l. control means connected with said heating plates for actuating said heating plate to heat the food item in said refrigerated serving container in contact with said plate while other food items in serving containers on the tray remain refrigerated.

11. The method for storing, refrigerating and heating food items in serving containers comprising the steps of placing the serving containers with food items to be served cold on the surface of a tray, positioning and supporting a serving container containing a food item to be heated within an opening extending through the tray surface with a peripheral portion of the container contacting the edge of the tray surface surrounding said opening, applying a cover to said serving container containing said food item to be heated, supporting said tray in a rack, displacing the serving container containing said food item to be heated from its initial position within said opening in the tray surface so that the serving container is positioned above and out of contact with said edge of the tray surface surrounding said tray opening, refrigerating all said serving containers including said container containing said food item to be heated, and applying heat to the container containing said food item to be heated while all said containers are being refrigerated.

12. The method of claim 11 wherein the serving containers are refrigerated by circulating a cold stream of air over and around said containers.

* * * * *